United States Patent [19]

Zielinski

[11] 4,309,948
[45] Jan. 12, 1982

[54] SOLIDS FEED NOZZLE FOR FLUIDIZED BED

[75] Inventor: Edward A. Zielinski, Harwinton, Conn.

[73] Assignee: Combustion Engineering, Inc., Windsor, Conn.

[21] Appl. No.: 176,224

[22] Filed: Aug. 7, 1980

[51] Int. Cl.³ .................................................. F23D 1/00
[52] U.S. Cl. .................................. 110/263; 110/245; 122/40; 431/170
[58] Field of Search .................. 110/263, 245, 347; 122/40; 431/7, 170; 34/57 A; 165/104 F; 239/DIG. 7

[56] References Cited

U.S. PATENT DOCUMENTS 4,130,071 12/1978 Porter ............................. 122/40 X

FOREIGN PATENT DOCUMENTS 663963 5/1979 U.S.S.R. .............................. 431/170

Primary Examiner—Edward G. Favors
Attorney, Agent, or Firm—Arthur L. Wade

[57] ABSTRACT

The vertical fuel pipe of a fluidized bed extends up through the perforated support structure of the bed to discharge granulated solid fuel into the expanded bed. A cap, as a deflecting structure, is supported above the discharge of the fuel pipe and is shaped and arranged to divert the carrier fluid and granulated fuel into the combusting bed. The diverter structure is spaced above the end of the fuel pipe and provided with a configuration on its underside to form a venturi section which generates a low pressure in the stream into which the granules of solid fuel are drawn to lengthen their residence time in the combustion zone of the bed adjacent the fuel pipe.

5 Claims, 3 Drawing Figures

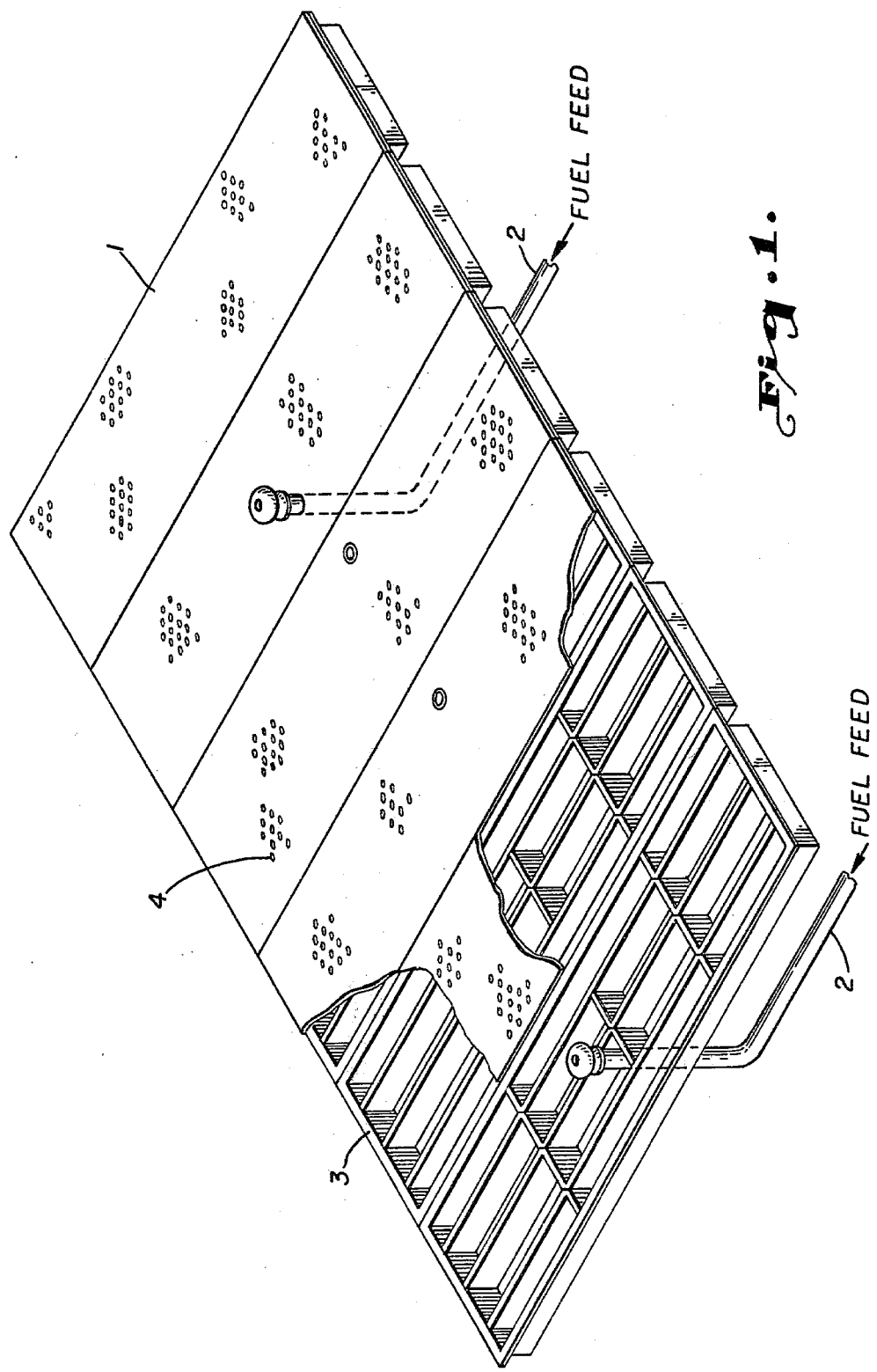

SOLIDS FEED NOZZLE FOR FLUIDIZED BED

The Government of the United States of America has rights in this invention pursuant to Contract No. EX-76-C-01-2473 awarded by the U.S. Department of Energy.

TECHNICAL FIELD

The present invention relates to the combustion of solid fuel particles as they are injected into a fluidized bed of the solid fuel. More particularly, the invention relates to the control of the residence time provided for fresh solid fuel particles in their travel within a fluidized bed for their more efficient combustion.

BACKGROUND ART

The art of burning solid fuel is receiving increased attention during the lengthening energy crisis. One of the developing techniques for the consumption of solid fuel includes reducing the solid fuel to particle size of about ¼" in diameter and combusting a bed of this material while the bed is fluidized.

The primary solid fuel is coal. This fossil fuel is granulated and supplied continuously to the combusting bed which is physically supported above a perforated structure up through which combustion air is forced. Fuel pipes are mounted to extend up through the perforated support and terminate within the expanded bed. A diverter structure is provided above the upper end of each of the fuel pipes to divert the fresh supply of fuel particles horizontally into the combusting bed. The fuel is transported up the fuel pipes by entrainment in air which moves the particles at a velocity in the order of thousands of feet per minute. Diverted horizontally into the combusting bed, the granulated solid fuel is provided with a residence time in the order of a few seconds before being entrained in the vaporized products of combustion traveling upward from the bed at a superficial velocity in the order of 7 feet per second.

The temperature of the combusting bed will vary, depending upon the type of coal available. The temperature of the combusting bed is expected to be generally in the order of 1550 F. With the freshly transported granulated coal passing through the combusting bed with only a residence time of a few seconds, complete combustion is not being obtained. The more volatile substances of the granulated coal ignite at about 800 F., but the carbon of the coal must reach the temperature of about 1300 F. The result, presently, is that a significant amount of freshly supplied fossil fuel escapes from the bed and must be recycled.

A cyclone, or centrifuge structure, presently receives the products of combustion discharging from the fluidized bed. The fuel particles not reduced to ash are collected and recycled to the fuel pipes. It is, of course, desired to reduce all of the solid fuel efficiently to ash and any limestone which has been added and is now spent which can be drawn from the bed through strategically placed drain pipes extending down through the perforated support, or carried downstream with the products of combustion for bag-house collection.

Thus, the present art needs to provide a greater residence time for the fresh granulated solid fuel discharged through its fluidized bed to more efficiently reduce the particles in combustion. The solid particles discharged from the upper end of the fuel pipe must be diverted into a path sufficiently elongated to provide the required residence time within the hottest portion of the combusting bed. Those portions of the bed adjacent the discharge of the fuel pipes are heated by the combustion of the volatiles of the freshly supplied fuel, and it is in these combustion zones that the freshly supplied fuel particles must be provided the residence time necessary for complete combustion.

DISCLOSURE OF THE INVENTION

The present invention contemplates providing a configuration for a cap mounted above the fuel pipe nozzle exit which will divert the gas-lifted, solid fuel particles into a path of sufficient length within the combustion zone of the combusting fluidized bed so as to cause the complete combustion of the solid fuel particles.

It is further contemplated that a horizontally extended cap above the exit of a vertical fuel pipe nozzle discharge will be shaped on its underside surface and positioned above the fuel pipe nozzle exit to provide a venturi structure through which the stream of fuel-entrained fluid will pass to generate a low pressure. The solid fuel particles, diverted by the cap, will be drawn back into the low pressure of the stream and their length of travel thereby elongated within the hotter combustion zone adjacent the fuel pipe. The extended residence time for the fuel particles within the combustion zone will insure efficient combustion of the fuel particles within the bed and obviate entrainment by the gaseous products of combustion.

Other objects, advantages and features of this invention will become apparent to one skilled in the art upon consideration of the written specification, appended claims, and attached drawings.

BRIEF DESCRIPTION OF THE DRAWINGS

FIG. 1 is a somewhat diagrammatic isometric of the support structure for a fluidized bed of combusting solid fuel and the feed pipes for supplying the solid fuel and embodying the present invention;

BEST MODE FOR CARRYING OUT THE INVENTION

Prologue

The best mode of the invention is embodied in structure which offers some difficulty in precise description. FIG. 1 represents the broad picture of a support for a fluidized bed of solid fuel with its plurality of fuel pipes carrying fresh fuel to the bed combusting above its support, while bed ash is flowed downward through drainpipes. The invention is embodied in the structure mounted about the nozzle discharge end of each fuel pipe. Superficially, it is readily perceived that the embodying structure gives the appearance of a mushroom whose stem is formed by the fuel pipe nozzle.

Figure 3:
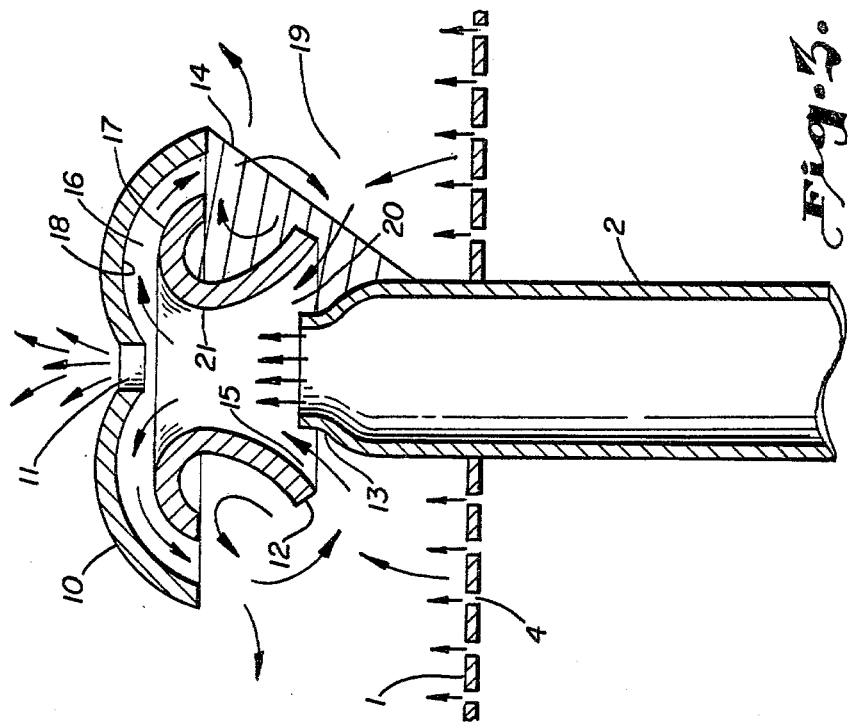
FIG. 3 is a sectioned elevation of the fuel feed distribution structure on the upper end of the fuel pipe of FIG. 2.
Figure 2:
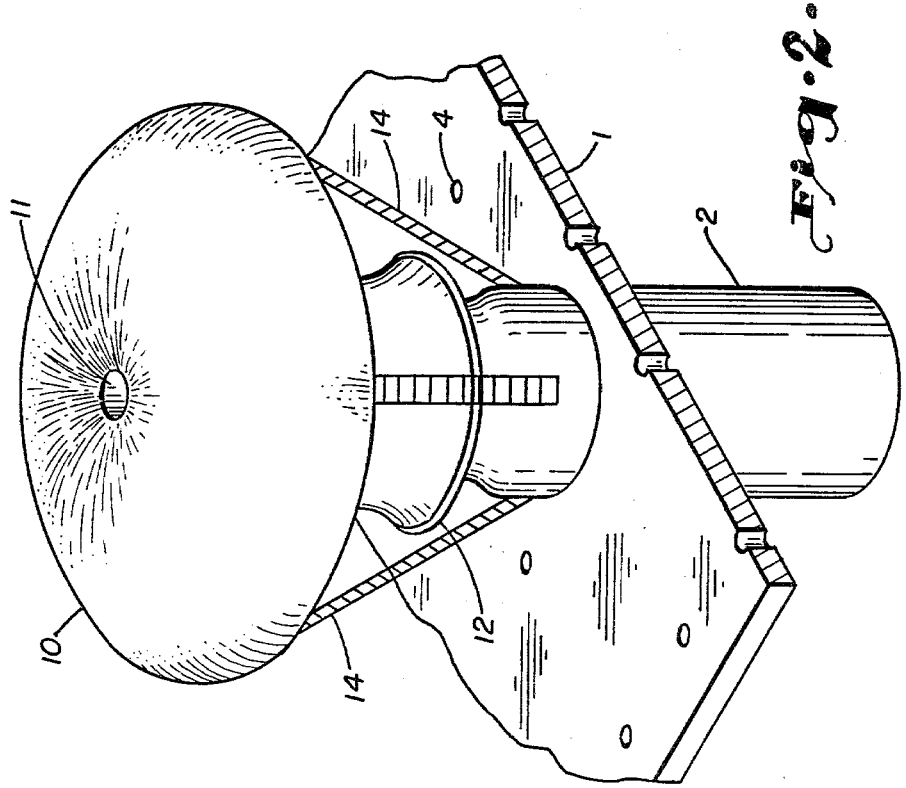
FIG. 2 is an isometric of a fuel feed distributing structure on the upper end of the fuel pipe of FIG. 1.

FIGS. 2 and 3 are provided to give visual representation of the embodying structure. With these drawings, it is apparent that an inverted saucer-shaped fuel distribution cap is centered over the feed pipe nozzle. The nozzle accelerates the discharging fuel feed flow. A nesting member beneath the inverted saucer-like cap will be termed "sub-structure". The sub-structure has a toroidial shape whose upper inner surface parallels the under surface of the fuel distribution cap and whose lower inner surface parallels the nozzle on the fuel pipe.

Functionally, the sub-structure will form a passage with the underside of the cap sufficiently narrow in relation to the volume of the fuel pipe to function as a venturi. The venturi generates a low pressure in the stream of fluid discharged from the passage from the fuel pipe nozzle. Correctly placed, this low pressure in the fluid stream will draw the solid fuel from the area surrounding the distribution cap into an elongated path which will provide the residence time within the combustion zone of the bed which will efficiently consume the solid fuel. With these concepts in mind, the detailed description of the structure embodying the invention should be easily understood.

Fluidized Bed Support

The broad concept of burning solid fossil fuel in a fluidized bed is easily understood. As an environment for the present invention, FIG. 1 discloses a perforated plate 1 above which a coal and limestone bed is maintained to a predetermined depth into which coal and limestone are injected while being burned. In the drawing convention utilized for FIG. 1, it is difficult to depict the bed supported above the plate 1. The intelligence of the observer is relied upon to appreciate that the actual burning bed of coal and limestone rests upon the upper surface of plate 1. The bed is formed of coal and limestone granulated down to individual pieces approximately $\frac{1}{4}''$ in diameter. The bed is replenished continuously, solid ash is continuously withdrawn, and gaseous products of combustion are conducted upward to transmit their heat to specific heat exchangers.

It is not necessary to disclose the present invention by illustrating the heat exchangers receiving the heat of combustion. It is to be understood that solid material, such as ash and unburned fuel particles, may be entrained by the upwardly flowing gaseous fluids. A mechanical centrifugal separator, or cyclone, may receive this entrained solid material and remove it from the gaseous products of combustion. Further, a bag house may also be positioned further downstream to remove additional solid particles which escape the centrifugal separation. All of this equipment need not be disclosed in order to teach the present invention.

Air is pressurized and flowed up through perforated plate 1 to expand the bed resting on its upper surface. Equipment supplying this pressurized, fluidizing air need not be illustrated to adequately disclose the present invention.

The disclosure purpose of plate 1 in support of the bed is to orient the relative locations of fuel pipes which bring replenishing fuel to the bed. It is apparent from FIG. 1 that the fuel pipes extend up through plate 1 and terminate within the expanded bed. Fresh, granulated coal and limestone are entrained within a stream of air flowing up through fuel pipes 2 to be discharged from nozzles on the upper end of the fuel pipes 2 and distributed within the bed. The present invention is embodied in structure at the upper discharge nozzle ends of these fuel pipes. This structure is formed and arranged to control the flow of the entrained fuel particles to insure their efficient consumption by combustion.

To flesh out the disclosure of FIG. 1, the supporting framework 3 is shown as beneath the perforated plate 1. Framework 3 is open to enable the combustion air, flowed from below, to pass readily up through the perforations 4 in plate 1. The structural supports for the framework 3 would needlessly encumber the disclosure without adding to the environment for the invention.

The Fuel Distribution System

In FIG. 2, a single fuel pipe 2, with its distribution system mounted above its nozzle, is disclosed in isometric. The fuel pipe 2 is seen to be topped by a cap 10 in the shape of an inverted saucer in which there is a central aperture 11. Sub-structure 12 can be partially discerned below the rim of saucer-shaped cap 10. The function of this cap, mounted at the upper, or discharge, end of fuel pipe 2, is to radially distribute the coal and limestone particles into the bed.

Fuel Distribution System Internals

Prepared by the preceding drawings, FIG. 3 becomes the detailed disclosure of the embodiment of the invention. Perforated plate 1 is again in evidence. Fuel pipe 2 is shown with fluid-entrained coal and limestone particles discharged from a nozzle 13 mounted on its upper end. Saucer-shaped cap 10 is more precisely defined as inverted, with its central aperture 11.

Sub-structure 12 is not disclosed fully in FIG. 2. This FIG. 3 does show the sub-structure in cross-section. The sub-structure is an annular toroidial section which provides for the channeling of solids and air from fuel pipe nozzle 13 and fluidized material surrounding the base of the fuel distribution system.

The supports for inverted saucer-shaped cap 10 and sub-structure 12 are shown as support ribs 14. It is the support ribs 14, attached to the upper end of fuel pipe 2, that form the necessary supports for the cap and sub-structure of the distribution system.

Arrows have been freely utilized to indicate the flow of the entraining air and solids discharged from the nozzle 13 of fuel pipe 2 and diverted by the passages formed by the surfaces of saucer-shaped cap 10 and sub-structure 12. Passage 16, formed between the upper inner surface 17 of sub-structure 12 and the under surface 18 of distribution cap 10, becomes the more important of the passages in receiving and diverting the flow of entraining fluid from fuel pipe 2. Some of this entraining fluid is discharged up through aperture 11, but the majority of the stream is diverted through passage 16 which is sized in capacity relative to the fuel pipe nozzle passage to create a venturi effect on this flow.

Precisely, the direction given the discharge of passage 16 into the surrounding bed will have to be empirically determined. Certainly, the direction of discharge will insure that a quantity of entrained fuel particles will be discharged horizontally into the bed. The release of the entraining fluid from passage 16 will generate low pressure area 19 which will extend downward toward the surface of plate 1. It is expected that a quantity of the particles of coal will be drawn into this low pressure area, lengthening the travel path of the coal particles in the combustion within the bed closely adjacent the fuel pipe 2.

The residence time provided for the granulated coal particles in the combustion area below low pressure area 19 will lengthen the residence time of the coal particles in this combustion area for efficient combustion of the carbon in the coal. It is reasonably expected that the particles of coal attracted into the low pressure area 19 will recycle through passage 16 by aspiration into passage 16 through available passage 20 which is between the lower inner surface 21 of sub-structure 12 and the nozzle 13.

The temperature of the coal particles held in the combustion area adjacent the fuel pipe will quickly rise to the combustion temperature of the volatiles of the coal. The combustion of these volatiles maintain a temperature adjacent the fuel pipe which is greater than other parts of the bed. Therefore, it is at this part of the bed that the fresh fuel has its residence time lengthened to promote combustion of the coal.

Conclusion

The invention, as disclosed, is in the shapes and arrangements of the inverted saucer-like cap 10, sub-structure 12, and nozzle 13, all mounted in static relationship to each other above and about the upper end of fuel pipe 2. This distribution structure for airentrained solid fuel is located within the combusting expanded bed of solid fuel supported above perforated plate 1.

The aperture 11, centrally located in cap 10, is sized to discharge enough of the fuel above the cap to support combustion in the portion of the bed in which the distribution structure is immersed. The greater amount of the fuel is discharged from passage 16, being directed somewhat downward in its radial distribution from beneath the outer edge of cap 10.

The greater significance of the arrangement disclosed is the low pressure generated in the stream of air and fuel discharged from passage 16. This low pressure is designated at 19, and is expected to extend downwardly toward perforated plate 1 to capture a large portion of the fresh fuel particles discharged from passage 16.

Of course, the precise path traced by the fresh fuel particles from passage 16 is difficult to analyze. Certainly, the path will be greatly elongated in comparison with the path that would be described by these particles if the particles had simply been diverted by the underside of cap 10 out into the bed. Additionally, it is expected that a portion of the fuel particles passing through the low pressure at 19 will be aspirated back into passage 16 through passage 20. This arrangement assures that some form of circulation will be provided for a substantial amount of the fresh fuel particles from fuel pipe 2 in the combustion zone closely adjacent the upper end of the fuel pipe extending above the perforated plate 1. The result is combustion reduction of the circulated fresh fuel particles in the portion of the fluidized bed having the higher temperature, all to the obviation of unburned portions of the fuel particles being entrained in the gases of combustion discharged upwardly from the bed with superficial velocity.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A fuel feed system for a fluidized bed of granulated solid fuel, including,
   a support structure horizontally extended and perforated and arranged beneath a bed of granulated solid fuel,
   a bed of granulated solid fuel extended over the upper side of the support structure while being combusted,
   a source of combustion air connected to the under side of the support structure with the arrangement to flow the combustion air up through the perforations of the support structure at a rate and quantity which will expand the bed while it is combusting,
   a fuel pipe mounted to extend up through the perforated structure and terminate a predetermined distance above the perforated structure and within the expanded and combusting bed,
   a source of fluid-entrained granulated solid fuel connected to the fuel pipe below the support structure to flow the fuel upward and discharge from the upper end of the fuel pipe,
   a cap structure supported above the upper end of the fuel pipe and horizontally extended to provide its under surface as a diverter of the entraining fluid and granulated fuel to be thereby radially distributed through the expanded bed,
   and a sub-structure supported about the upper outlet of the fuel pipe and spaced from the under side surface of the cap to form a passage for the fuel and entraining fluid which will create a predetermined lowered pressure in the stream downstream of the passage,
   whereby the area of lowered pressure in the stream will cause a significant portion of the granulated solid fuel particles to flow in an elongated path through the area of combustion within the bed adjacent the fuel pipe to cause satisfactory combustion of the fuel particles.

2. The fuel feed system of claim 1, wherein,
   the cap is in the form of a saucer inverted over the upper end of the fuel pipe to provide its underside with a curvature which will direct its passage formed with the sub-structure toward the perforated support structure.

3. The fuel feed system of claim 2, wherein,
   the sub-structure is in the form of a torus horizontally centered as supported over the discharge of the fuel pipe and spaced therefrom to form a passage between the lower surface of the substructure and the fuel pipe opening to provide a second passage connected with the lowered pressure in the stream through which granulated fuel particles are aspirated back into the first passage.

4. The fuel feed system of claim 3, including,
   a nozzle structure mounted on the upper end of the fuel pipe with an opening to establish the predetermined flow rate of the fluid and entrained fuel particles discharged from the fuel pipe.

5. The fuel feed system of claim 3, including,
   an aperture formed vertically and centrally through the cap saucer with the size to discharge a predetermined quantity of fuel particles which will maintain bed combustion above the cap saucer.

* * * * *